(12) United States Patent
Davis et al.

(10) Patent No.: US 6,620,450 B1
(45) Date of Patent: *Sep. 16, 2003

(54) PRESERVATION OF BAKED GOODS

(75) Inventors: Martin E. Davis, Tonka Bay, MN (US); Pauline M. Olson, Savage, MN (US); Laurie Nelson, Bloomington, MN (US)

(73) Assignee: Davisco Foods International, Inc., LeSueur, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/689,069

(22) Filed: Oct. 12, 2000

Related U.S. Application Data

(63) Continuation of application No. 08/889,883, filed on Jul. 2, 1997, now abandoned.

(51) Int. Cl.⁷ .............................................. A21D 13/00
(52) U.S. Cl. ...................... 426/549; 426/94; 426/656
(58) Field of Search .................... 426/549, 94, 656, 426/496

(56) References Cited

U.S. PATENT DOCUMENTS

| | | | |
|---|---|---|---|
| 3,202,514 A | 8/1965 | Burgess et al. ................. 99/2 |
| 3,753,734 A | 8/1973 | Kaplow et al. ................. 99/92 |
| 3,791,283 A | 2/1974 | Moreno et al. ................. 99/57 |
| 3,941,895 A | 3/1976 | Ash et al. ................. 426/549 |
| 4,081,555 A | 3/1978 | Sawhill ................. 426/2 |
| 4,109,025 A | 8/1978 | Lauck ................. 426/551 |
| 4,118,514 A | 10/1978 | Hoseney et al. ................. 426/62 |
| 4,154,863 A | 5/1979 | Kahn et al. ................. 426/553 |
| 4,214,010 A | 7/1980 | Corbett ................. 426/573 |
| 4,301,179 A | 11/1981 | Schmidt ................. 426/19 |
| 4,421,777 A | 12/1983 | Chung ................. 426/553 |
| 4,501,757 A | 2/1985 | Smith et al. ................. 426/62 |
| 5,262,187 A | 11/1993 | Hahn ................. 426/391 |
| 5,320,859 A | 6/1994 | Namdari ................. 426/551 |
| 5,436,014 A | 7/1995 | Damodaran ................. 426/33 |
| 6,060,093 A * | 5/2000 | Davis et al. ................. 426/74 |

OTHER PUBLICATIONS

Sherwin, "Use of Whey and Whey Products in Baked Goods", *Research Department Technical Bulletin, XVll(11)*, Editor, Gur Ranhotra, 1–6 (1995).

* cited by examiner

*Primary Examiner*—Lien Tran
(74) *Attorney, Agent, or Firm*—Schwegman, Lundberg, Woessner & Kluth, P.A.

(57) ABSTRACT

A process for preserving baked goods takes advantage of the discovery that a form of modified whey characterized by a calcium content of at least 3%, protein content of from 10 to 20%, and a phospholipid content of at least 2%, has high antimicrobial activity, particularly, antimycotic activity. Baked flour-containing foods are formulated to contain sufficient amounts of the modified whey to provide a desired antimicrobial activity, e.g., from about 2 to about 10% of the modified whey will improve the stability of baked goods having moisture contents as high as 50%.

20 Claims, No Drawings

PRESERVATION OF BAKED GOODS

This application is a continuation of 08/889,883 filed Jul. 2, 1997, now abandoned.

TECHNICAL FIELD

The invention relates to baked food products improved with a modified whey of novel composition to control microbial growth, and a process for improving the storage stability of baked goods by supplementing the dough or batter used to prepare them with the modified whey.

Baked goods tend to be susceptible to microbial growth. Mold growth is a severe problem, especially in moist products, such as bread, cake, donuts and moist cookies. Preservatives can be added to some foods, but generally add expense and are perceived as chemical adulterants by many consumers—they provide no nutritional improvement to a food substrate and are of no functional importance other than preservation.

While a number of efforts have been made to address these interrelated problems, the art is in need of effective solutions.

BACKGROUND ART

In developed nations, the incentive for food preservation is largely one of economics. In less-developed societies, life itself depends on the ability of man to avoid waste of food. There is a need for a preservation technology that is fully compatible with moist baked goods processing and, preferably, will have some other advantage such as to aid in reducing the amount of other ingredients.

Many food additives have been available as preservatives. For example, in U.S. Pat. No. 3,202,514, Burgess, et al., describe the use of sugars and other soluble food ingredients to provide shelf stability in intermediate moisture foods. This technology has been adapted to a wide variety of foods, including meats, vegetables, soups and stews, baked goods and others, typically having moisture contents of from about 15 to 50%. However, the use of anitmycotics is still considered necessary.

In U.S. Pat. No. 3,753,734, Kaplow, et al., describe the preparation of shelf stable pancake and waffle products. Because these products have such high moistures and water activities, the use of polyhydric alcohols constitute the principal source of water soluble solids. In addition, antimycotics such as sorbates are preferably employed.

In U.S. Pat. No. 4,154,863, Kahn, et al., describe a variety of intermediate moisture, ready-to-use, frozen foods. They assert that microbiologically stable flour based batters can be prepared which remain soft and ready for use at freezer temperatures and which can be maintained at room temperature and refrigerator temperature for an extended period of time, by controlling their sugar/fat content. The batters are of intermediate-moisture content and have sufficient sugar solutes to provide a bacteriostatic effect.

Many other food ingredients have been added for nutritional advantage or as cost-saving substitutions for other ingredients, but have not been recognized for preservation. For example, whey, as it is conventionally available, has been used as an ingredient for human and animal foods. Historically, it was used as a waste product and for animal feed products. More recently, economically attractive uses for whey have been found—not only for its own inherent nutrition, but also as a replacement for eggs, flour or fat. See for example, G. Ranhotra, "Use Of Whey And Whey Products In Baked Goods", Technical Bulletin, Volume XVII, Issue 11, November 1995. Several modified forms of whey have been developed, principally by fractionating to obtain various fractions valuable for specific uses based on the concentration of nutritional or functional characteristics.

Conventionally-available whey products as described in the above reference have low protein, fat and ash contents. With typical, high concentrations of lactose, commercial sweet whey is often suggested for use in low amounts (2 to 6% of flour) in yeast-leavened bakery products to improve crust color, tenderize crumb and improve color. Baked goods containing it, however, are still highly-susceptible to mold growth.

In U.S. Pat. No. 4,301,179, Schmidt discloses a bread dough for standard white bread which incorporates whey and pea flour. Pea flour in a relatively small amount is said to act to substantially reduce dough mixing time, to increase fermentation aroma, and to obtain improved taste in the bread, and yet not destroy the well recognized character of the baked product as standard white bread. The disclosure also relates to a milk substitute for use in bread that consists essentially of a dry blend of pea flour and whey. Bread dough having the pea-whey milk substitute is said to be characterized by reduced mixing and fermentation times, but also the resulting baked bread has been found to have a superior crust color and crumb structure.

In U.S. Pat. No. 4,421,777, Chung describes a process for preparing a chocolate flavored cake comprising mixing together and baking cake ingredients, and adding to the ingredients of about 3% to about 15% on a flour basis of (1) a defined whey protein-containing composition in combination with (2) an amount of sodium bicarbonate sufficient to elevate the pH of the cake crumb to a pH within the range of about 7.5 to about 9.

In U.S. Pat. No. 5,320,859, Namdari describe a high protein dough mix for a leavened bakery product, consisting essentially of, by weight, in unflavored form, a blend of up to 20% water, 10–80% of a protein containing material selected from the group consisting of soy products, gluten, milk products, whey products, egg products and nuts, 10–80% of a sweetener, up to 40% of a vegetable shortening, up to 50% flour, and up to 8% of a leavening agent. The dough mix may be baked and served as a cookie, a muffin, a cake, a brownie, or a snack bar.

In U.S. Pat. No. 4,501,757, Smith, et al., describe yeast quickener and dough conditioner compositions having the ability to reduce raising and baking times and improving shelf life of the baked product. Particularly superior characteristics are reportedly obtained by adding an activating amount of fenugreek and a rancidity inhibiting amount of rosemary to a combination of (1) whey solids, (2) lecithin, (3) ascorbic acid, along with fillers and flavoring agents such as starch, salt, dried honey and silica gel or a silicate salt.

In distinction to conventional whey, a variety of modified whey products have been proposed for a number of food supplements.

As noted above, and in U.S. Pat. No. 3,791,283, to Moreno, et al., whey can be concentrated to improve its protein content to make it more suitable for use as a protein supplement. In the noted patent disclosure, the protein is also specially treated to make it more stable in an acid beverage. However, the microbiological stability of the product is not apparently improved.

Indeed, in U.S. Pat. No. 4,081,555 there are described whey concentrates stabilized against putrefying action using a combination of downward pH adjustment (to 2.5–4.2) and a preservative agent. The best results are obtained with benzoates and/or sorbates as the preservative agent.

In U.S. Pat. No. 5,262,187, Hahn discloses a low-fat dry mix, ready-to-use batter and baked compositions which are composed of a sweetened, cereal-grain ingredient base with a fat mimetic system of polydextrose, cellulosic material, non-fat milk solid or substitute, emulsifier, modified food starch, and a mixture of xanthan gum and guar or locust bean gum, preferably with lecithin and whey protein concentrate. The baked composition is reported as moist, tender, crumbly with good mouthfeel but contains, one-third fewer calories than a similar full-fatted composition.

In U.S. Pat. No. 4,109,025, Lauck discloses partially replacing the shortening requirement of leavened baked goods with a whey protein concentrate wherein the protein is substantially undenatured and non-oxidized. Protein enriched, lower fat content products such as biscuits are prepared.

In U.S. Pat. No. 4,214,010, Corbett discloses replacing up to 75% of the whole egg requirement of a custard using from about 40% to about 60% of a whey protein concentrate containing from about 0.5% to about 5% carboxymethyl-cellulose and from about 60% to about 40% of a lactylated shortening. They report substantially no change in the food product containing the substitution which provides an economic advantage.

In U.S. Pat. No. 3,941,895, Ash, et al., describe a selected demineralized and partially delactosed whey is used as a substitute for nonfat dry milk in various food compositions. The selected whey has a predetermined ash to protein ratio of 0.01 to 0.3. Also, the selected whey can be combined with a modified starch to provide a satisfactory replacement for the nonfat dry milk constituent in baked goods.

In U.S. Pat. No. 4,118,514, Hoseney, et al., disclose a low-cost substitute for nonfat dry milk (NFDM) solids as a functional equivalent of NFDM in yeast-leavened doughs used in bread making or the like. It is said to provide desirable organoleptic properties such as loaf volume, crumb quality and crust color. The substitute comprises a component such as an ammonium salt which serves as a source of ammonium ion in the dough, and a quantity of deproteinized whey; these components are characterized as synergistic for maintaining or enhancing loaf volumes while giving good crust color and crumb quality, notwithstanding the fact that deproteinized whey alone has deleterious effect when used alone in doughs. In preferred forms, the substitute is said to serve as both a functional and at least a partial nutritional replacement for NFDM in yeast-leavened doughs, but is lower in cost and can be used without difficulty in both batch and continuous bread making processes.

There remains a need for a process for preserving baked goods and to the resulting baked goods.

DISCLOSURE OF THE INVENTION

It is an object of the invention to provide a process for preserving baked goods.

It is another object of the invention to provide preserved baked goods.

It is another object of the invention to provide formulations and processes for baked goods that eliminate the need for special preservatives.

It is a further object of the invention to provide baked goods preservatived with economical food ingredients that are not perceived as chemical adulterants.

It is yet another object of the invention to provide formulations for baked goods with food additives that can replace the functionality of more expensive ingredients and, in addition, have a preservative function.

It is also an object of the invention to provide foods preserved with additives that replace other, more-costly food ingredients.

These and other objects are achieved by the present invention, which provides baked products preserved with modified whey and a process for preparing baked products with improved stability by utilizing modified whey in their preparation, the modified whey being characterized by a calcium content of at least 3%, protein content of from 12 to 18%, and a phospholipid content of at least 2%.

Many of the preferred aspects of the invention are described below.

INDUSTRIAL APPLICABILITY

The following description will illustrate the preparation of preferred preserved foods and processes according to the invention, including those highlighted above. The processing will be described in terms of the procedures effective for the materials employed in the various formulations. It will be understood by those skilled in the art, however, that some will have to be modified to accommodate them where necessary.

Basic to all of the embodiments of the invention is a "modified whey", which is defined as a whey fraction characterized by a calcium content of at least 3%, protein content of from 12 to 55%, and a phospholipid content of at least 2%. The calcium content is in highly soluble form and is homogeneously dispersed therein, as can be obtained by being codried with the protein, fat and sugar components separated to form the whey fraction. Calcium in this form is distinguished from calcium added as a salt that is simply mixed in dry form with whey. Preferred forms of modified whey are further characterized as conforming to the following analysis, based on a 100-gram sample.

| COMPONENT | PREFERRED | RANGE |
| --- | --- | --- |
| Calories (Kcal) | 320 | 300–340 |
| Total Fat (g) | 4 | 2–5 |
| Saturated Fat (g) | 2.5 | 1–4 |
| Extractable Fat (g)[a] | 2 | 1–4 |
| Cholesterol (mg) | 100 | <200 |
| Total Carbohydrates (g) | 55 | 50–60 |
| Sugars (g) | 55 | 50–60 |
| Total Protein (g) | 14–16 | 10–20 (e.g., 12–18) |
| Calcium (g) | 5 | 3–10 (e.g., 4–6) |
| Sodium (g) | 1 | <2 |
| Iron (mg) | 0.5 | <1 |
| Riboflavin (g) | .8 | <1 |
| Phosphorus (g) | 2 | 1–3 |
| Potassium (g) | 1.5 | 1–2 |
| Magnesium (g) | .200 | <1 |
| Ash (g) | 20 | 15–25 |
| Moisture (g) | 5 | 1–6 |

Typical calcium to phosphorous ratios are within the range of from about 2:1 to about 10:1, e.g., about 5:2. Similarly, typical calcium to protein ratios are within the range of from about 1:4 to about 4:5, e.g., about 1:3. And, typical calcium to fat (essentially as phospholipid) ratios of from about 3:1 to abut 10:1, e.g., about 4:1.

Products meeting these specifications can be prepared from whey by fractionation and drying to obtain the noted composition. They are commercially available, for example, under the trademark VERSAPRO (various grades, including A, B, D, F, M, N, S) from Davisco Foods International, Inc., LeSueur, MN.

Example 1, below reports the results of a study to challenge several substrates (both using and not using the invention) with mold cultures to determine their susceptibility to mold growth, and Example 2 illustrates the use of modified whey as an antimycotic in baking cake donuts.

Among the food products that can be improved according to the invention are baked goods, other flour-based foods such as pasta and noodles, prepared entrees, meat extenders or extended meat products, and other foods, e.g., snack foods of the type prepared by extruder expansion and gun puffing. An advantage of the invention is that the use of modified whey can enable reducing or eliminating egg yolks in some formulations and can have advantages in nutrition and leavening, color and flavor in baked products.

Baked goods and doughs (the term "dough" as used herein is also intended to include "batters") for their preparation, can be formulated as usual to contain modified whey and at least flour and water in reasonable amounts to form the desired dough for baking. Among baked goods are included cakes, cookies, crackers, breads, pan cakes, biscuits and other baked products of less-distinct grouping.

The term flour includes flour milled from starchy plants, flour substitutes, and starches. Flours and starches useful in this invention include those derived from wheat, corn, rice, waxy maize, rye, barley, peas, various beans, potato, arrow root, sorghum and waxy sorghum. Starches can be raw, gelatinized, chemically modified or physically treated. Generally about from 15 to 80% flour is adequate, depending on the type of baked goods desired. More typical amounts will be from about 20 to 60%. The amount of water added will depend on the nature of the dough or batter desired for a particular type of product. The water will be sufficient to hydrate the ingredients sufficiently to form the batter or dough and sufficient to gelatinize the starch in the flour.

Most doughs will also contain salt, sugar, fat or oil and leavening, such as yeast or chemical leavening such as baking powder. Some doughs made for extrusion contain no leavening and are expanded by extrusion. Baked goods can employ as much of the modified whey as can be tolerated by the particular product in terms of texture, taste and appearance. Typical concentrations of modified whey will range from about 2 to about 25%, preferably from 3 to 10%, of the modified whey based on the weight of product. Using at least 10% on this basis will generally have a significant impact on deterring mold growth in baked products, yet permit yeast growth in batters and doughs.

The type of fat can be varied widely between saturated and unsaturated depending on the type of cake and texture desired. An unsaturated fat will often provide superior flow and nutritional properties.

Fats high in unsaturation are typically liquid at room temperature and often referred to as oils, include safflower oil, corn oil, soybean oil, cottonseed oil and sunflower oil—unsaturated fats typically have iodine values of about at least 50 which include partially hydrogenated fats, and the more highly unsaturated fats with an iodine value above about 100. These fats are often recommended for dietary purposes, particularly for those with a high plasma cholesterol level which is associated with atherosclerosis.

The saturated fats include the hydrogenated oil products of coconut, cottonseed, corn, soybean, peanut, olive, etc. Fats having a melting point of 90°–94° F. are preferred, i.e., the melting point should be below body temperature.

The term "sugar" is to be understood as meaning any of a number of useful saccharide materials. Included in the list of useful sugars are the mono-saccharides, di-saccharides and polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides.

The products of this invention are characterized by its substantial resistance to bacterial decomposition, but may serve as a host for yeasts and mold, the foods of this invention may have an antimycotic agent incorporated at a sufficient level to prevent the growth of such organisms. It is an advantage of the invention that the amount required for this purpose will be less than otherwise. Sorbate salts such as potassium sorbate as well as sorbic acid can be used either separately or in combination. Propylene glycol which may be used alone or with other humectants like sorbitol to impart a further degree of product softness or tenderness can also serve as an anti-mycotic. Other anti-mycotic agents will be apparent to those skilled in the art. The amount of anti-mycotic agent added is selected so as to produce the desired results and will constitute a minor proportion of the product, about 0.1% or higher, depending on the particular anti-mycotic and the particular product composition, although even lower levels in the order of 50 p.p.m. can be employed in the case of some anti-mycotics as pimarcin. Potassium sorbate in a water solution can be sprayed into the surface of the food or the food can be dipped in this solution; other anti-mycotics lend themselves to such surface application as esters of the parabens (para-hydroxy benzoate) such as propyl and methyl parabens (methyl para-hydroxy benzoate). Cellophane and other enwrapments for the food can be spray coated with a sorbic acid solution but impregnation or dusting with sorbic acid or potassium sorbate is preferred. Anti-mycotics which can generally be used are benzoic acid, sodium benzoates, proprionic acid, sodium and calcium proprionate, sorbic acid, potassium and calcium sorbate, propylene glycol, diethyl pyrocarbonate, and menadione sodium bisulfite (vitamin K).

Other ingredients known to those skilled in the art may also be employed to impart their characteristic effects to the compositions of the present invention. Typical of such ingredients are flavoring agents, colorants, vitamins, minerals, and the like. Suitable flavoring agents can be employed to impart vanilla, cream, chocolate, coffee, maple, spice, mint, butter, caramel, fruit and other flavors. Additionally, the use of certain polyols such as sorbitol and mannitol can be employed to modify mouthteel. Furthermore, other additives such as phosphates and the like may be employed for their known functions. Several types of ingredients used are described below.

Protein in the form of whole egg, egg whites, egg yolks, or various concentrates and isolates are useful to improve the nutritional qualities of the product and to facilitate and maintain structure. Protein also aids in emulsification and contributes to flavor. Bland protein concentrates with a wide range of fiber content, bland soy flour, milk powder and food proteins are all useful, generally in concentrations about from 0–10%, preferably about from 0.3–3%. Alternatively, use can be made of a protein such as sodium or calcium caseinate, or as its substitute a protein hydrolysate in a minor amount.

Emulsifiers are often employed in baked goods for emulsification, dough conditioning and other utilities. A wide variety of emulsifiers may be employed in amounts on the same order as in the prior art oil-in-water emulsions for example, about from 0.1–5%, preferably about from 0.2–1.5%. Among those suitable are: hydroxylated lecithin; mono, di, or polyglycerides of fatty acids, such as monostearin and monopaimitin; polyoxyethylene ethers of fatty esters of polyhydric alcohols, such as the polyoxyethylene ethers of sorbitan monostearate (polysorbate 60) or the polyoxyethylene ethers of sorbitan distearate; fatty esters of polyhydric alcohols such as sorbitan monostearate; mono- and di-esters of glycols such as propylene glycol monostearate, and propylene glycol monopalmitate, succinoylated monoglycerides; and the esters of carboxylic acids such as lactic, citric, and tartaric acids with the mono-and diglycerides of fatty acids such as glycerol lacto paimitate and glycerol lacto stearate. The fatty acids employed in the preparation of the emulsifiers include those derived from beef, tallow, and coconut, cotton seed, palm, peanut, soybean and marine oils. Many blends of emulsifiers are commercially used and readily available in accordance with known techniques. For example, it may be desirable to provide a controlled hydrophil-lipophil balance (HLB) as with a lipophilic emulsifier such as glyceryl monostearate or sorbitan monostearate with a hydrophilic material such as polysorbate 60.

The compositions of the present invention can also include one or more stabilizers or hydrophilic colloids to improve processing and product properties as known in the art. These stabilizers are natural, i.e. vegetable, or synthetic gums and may be, for example, carrageenin, guar gum, alginate, xanthan gum and the like or methylcellulose, carboxymethylcellulose, ethylcellulose, hydroxypropyl methylcellulose (Methocel 65 HG), micro-crystalline cellulose and the like, and mixtures thereof. Typically, a gum or combination of gums is employed with a sugar, e.g. dextrose, carrier. The amount of these stabilizers can be varied widely in accordance with the amounts required in prior art compositions, generally about from 0–2%, preferably about from 0.1–0.5%.

Many types of salts are used in the compositions of this invention for flavoring, including common salt (sodium chloride), sodium or potassium phosphates, citrates, chlorides, and the like, in amounts about from 0–5%, but preferably about from 0.1–1%.

Antioxidants such as butylated hydroxytoluene, butylated hydroxyanisole and tertiary butyl hydroquinone may be used in minor amounts (i.e. as Tenox 22 antioxidant).

Food grade acidulants such as phosphoric, tartaric, malic, citric, fumaric, hydrochloric and the like edible food acids are suitable to impart tartness, control pH or serve as a preservative.

The preferred products of the invention will have $A_w$ (water activity) values of from about 0.60 to about 0.95. The term "water activity" is well understood in the art to be a measure of free water in a food and is typically measured by measuring the equilibrium relative humidity in the head space of a container holding a test food which has been given time to equilibrate. Under some circumstances, some mold and yeast can grow at $A_w$ values less than 0.60, but typically dry baked goods having moistures of 2–3% can be stored at 65% relative humidity without spoilage. On the other hand, foods with $A_w$ values above about 0.85 are difficult to stabilize without significant levels of chemical additives.

There are commercially available devices for measuring the water activity of formulations. For example, a formulation may be placed in a container until equilibration is reached and then the humidity in the container measured—based on standard tables the water activity is then determined. For example, electric hygrometers are devices commonly used to measure water activity. These devices contain sensors impregnated with salts such as lithium chloride or potassium chloride. Water is adsorbed on the sensor and causes a change in electrical resistance which is measured by a wheatstone bridge. Reference curves based on solutions of known humidity are used to relate the electrical readings to water activity.

The bafters and doughs are prepared in the typical fashion for the type of product desired. The flour and water are typically mixed with the intensity needed to either develop gluten, emulsify fats or simply mix without either—as the case may be. Once prepared, the dough or batter is permitted to rise in the case of yeast-leavened goods or directly baked in the case of chemically-leavened goods. The baking times, as the mixing, are well within the skill of the art. Baking by oven, stove top, extruder or other suitable cooking device are all included.

The following Examples are provided to further illustrate and explain a preferred form of the invention and are not to be taken as limiting in any regard. Unless otherwise indicated, all parts and percentages are by weight.

EXAMPLE 1

This example reports the results of a study to challenge several substrates with mold cultures to determine their susceptibility to mold growth.

PDA (potato dextrose agar) samples were made with 1, 2, 4 and 5% NFDM (nonfat dry milk), whey, VersaPRO® modified whey, and plain PDA for control. A 50% solution was made of each and then added to sterile agar to get the 1, 2, 4, 5% PDA+. Plates were left at room temperature to harden. The PDA plates with the above solutions, but no dusting of mold (i.e., negative control) showed no mold growth.

Mold spores were dusted on the surface of the PDA plus solutions plates, and also onto the plain PDA plates. Plates were left at room temperature for 7 days and then read for mold by counting colonies. All plating was done in duplicate.

| PLATE | 1% | 2% | 4% | 5% |
|---|---|---|---|---|
| NFDM | 11,10[b] | 9,12 | 10,10 | 11,10 |
| WHEY | 12,10 | 10,10 | 9,9 | 10,9 |
| VersaPRO ® | 11,12 | 11,10 | <1 | <1 |

PDA dusted control 11,12 colonies per plate
Negative control Negative at all %
[b]Numbers Are Reported In Molds Per Plate From the above, it can be seen that the modified whey provided significant improvement in stability against mold growth.

EXAMPLE 2

This example illustrates the use of modified whey as an antimycotic in baking cake donuts.

Samples were prepared using donut mix and either nonfat dry milk (NFDM) or VersaPro modified whey as additives were mixed with water according to the suggested recipe to provide a batter which was then cooked, also according to the recipe to provide a series of products that were stored in plastic bags at room temperature.

| SAMPLES | | |
|---|---|---|
| (100) | 1) Mix + NFDM @ 4.3% – control | water 44 |
| (97.81) | 2) Mix + VersaPro @ 2.19% | water 44 |
| (98.91) | 3) Mix + VersaPro @ 3.29% | water 44 |

| SHELF LIFE | | |
|---|---|---|
|  | Control | VersaPro |
| Day 1 | ✓(c) | ✓ |
| Day 4 | ✓ | ✓ |
| Day 6 | ✓ | ✓ |
| Day 7 | ✓ | ✓ |
| Day 12 | mold on one | ✓ |
| Day 14 | more mold on one | ✓ |
| Day 18 | completely molded | ✓ |
| Day 20 | completely molded | ✓ |
| Day 36 | completed molded | first sign of visible mold growth |

(c)✓ = no mold visible

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A baked product having improved preservation against mold growth, prepared by baking an aqueous mixture comprising:
    flour or flour equivalent; and
    modified whey characterized by a calcium content of at least 3%, protein content of from 10 to 20%, and a phospholipid content of at least 2%, said modified whey being in an amount sufficient to provide an antimycotic effect.

2. A baked product according to claim 1, further comprising fat.

3. A baked product according to claim 1, further comprising sugar.

4. A baked product according to claim 1, further comprising leavening.

5. A baked product according to claim 1, wherein the modified whey is employed in an amount of from 2 to 25% based on the weight of the product.

6. A baked product according to claim 5, wherein the modified whey is employed in an amount of from 3 to 10% based on the weight of the product.

7. A baked product according to claim 1, having a moisture content of from 5 to 50% based on the weight of the product.

8. A baked product according to claim 1, wherein the modified whey has a protein content of from 12 to 18% and a calcium content of from 3–10%, both percentages based on the weight of the modified whey.

9. A baked product according to claim 1, wherein the water activity is within the range of from 0.60 to 0.95.

10. A baked product according to claim 9, wherein the water activity is within the range of from 0.65 to 0.85.

11. A process for preparing a baked product having improved preservation against mold growth, comprising:
    preparing an aqueous mixture comprising flour or flour equivalent, and modified whey characterized by a calcium content of at least 3%, protein content of from 10 to 20%, and a phospholipid content of at least 2%, said modified whey being present in an amount sufficient to provide an antimycotic effect; and
    baking the aqueous mixture.

12. A process according to claim 11, wherein the aqueous mixture further contains a leavening ingredient selected from the group consisting of yeast and chemical leavening.

13. A process according to claim 11, wherein the aqueous mixture further comprises fat.

14. A process according to claim 11, wherein the aqueous mixture further comprises sugar.

15. A process according to claim 11, wherein the modified whey is employed in an amount of from 2 to 25% based on the weight of the product.

16. A process according to claim 11, wherein the modified whey is employed in an amount of from 3 to 10% based on the weight of the product.

17. A process according to claim 11, wherein the aqueous mixture is baked to achieve a water activity within the range of from 0.60 to 0.95.

18. A process according to claim 17, wherein the water activity is within the range of from 0.65 to 0.85.

19. A process according to claim 11, wherein the aqueous mixture is baked to achieve a moisture content of from 5 to 50% based on the weight of the product.

20. A process according to claim 11, wherein the modified whey has a protein content of from 12 to 18% and a calcium content of from 3–10%, both percentages based on the weight of the modified whey.

* * * * *